Patented May 30, 1939

2,160,604

UNITED STATES PATENT OFFICE 2,160,604

PROCESS OF PRESERVING EGGS

Howard H. Stamper, Moberly, Mo., assignor to F. M. Stamper Company, Moberly, Mo., a corporation of Missouri No Drawing. Application April 25, 1938, Serial No. 204,101

3 Claims. (Cl. 99—196)

The object of the present invention is to devise a practicable process whereby the natural tendency of eggs to deteriorate can be quickly checked preliminary to cold storage thereof. Heretofore it has been the practice to chill eggs slowly, that is, over a period of about forty-eight to seventy-two hours, prior to cold storage thereof and, during this long period, the eggs are liable to deteriorate considerably. Heretofore it has been impracticable to chill the eggs quickly because, in the process of chilling, the contents of an egg shell shrink considerably more than the shell itself, with the result of developing such difference in pressures inside and outside of the shell as to cause some of the bacteria, which are always present on and about the shell, to pass through the pores of the shell and carry on their work of destruction inside of said shell. According to the present invention, the egg shell is sterilized and its contents immediately chilled quickly in a bath containing a suitable germicide so that the natural process of deterioration inside of the shell is quickly checked without allowing any outside bacteria to pass through the shell.

In carrying out the present process, I prefer to use a bath of water containing caustic soda (sodium hydroxide, NaOH) equal to about .35 percent by weight of the solution. This solution is contained in a suitably refrigerated tank which is provided with means for keeping the liquid solution at a temperature in the neighborhood of 33 degrees Fahrenheit. This tank is preferably provided with an endless conveyer that is adapted to carry an egg tray or the like through the solution in about ten to twenty minutes. According to my process, the eggs to be treated are placed on the conveyer and carried thereby through the germicidal solution, which is maintained at a temperature within a few degrees of the freezing point, say at a temperature of about 33 degrees Fahrenheit. The immersion of the egg in the germicidal solution kills the bacteria thereon at the very beginning of the chilling process, and as the chilling operation proceeds while the egg is still immersed in the germicidal solution, there is no possibility of live bacteria passing through the shell. With the refrigerant solution kept near the freezing point, the temperature of the egg is lowered to storage temperature within the ten to twenty minutes during which it is being carried through the solution. Thus the normal deterioration of the egg inside the shell is checked far more rapidly than has heretofore been practicable and all outside bacteria are killed at the same time. The egg thus chilled and with its outer surface sterilized is then placed in cold storage where it effectively resists deterioration.

While it is advantageous to perform simultaneously the operations of sterilizing the shell and chilling the contents, I consider it within the scope of my invention to perform these two operations separately, that is, to first sterilize the shell and then chill the egg under conditions which will exclude live bacteria therefrom while undergoing the chilling operation.

Likewise, while I have found a .35 percent solution of caustic soda to be especially advantageous for the germicidal and chilling bath, the amount of such caustic soda may vary substantially, say from about .25 percent to about 1.50 percent. Likewise, other germicides may be substituted for caustic soda, but, of course, no germicide should be selected which will damage the shell or which will harmfully affect the taste, odor or appearance of the contents.

What I claim is:

1. In the process of preserving eggs, the operation of quick chilling the same in a weak solution of caustic soda preliminary to cold storage thereof.

2. The process of preserving eggs which consists in quick chilling the same in a bath of water containing approximately .35 percent caustic soda kept at a temperature of approximately 33 degrees Fahrenheit and then placing same in cold storage.

3. The process of preserving eggs which consists in keeping the same immersed for approximately 10 to 20 minutes in a bath of water containing approximately .35 percent caustic soda and kept at a temperature of approximately 33 degrees Fahrenheit and then placing same in cold storage.

HOWARD H. STAMPER.